United States Patent Office 3,552,921
Patented Jan. 5, 1971

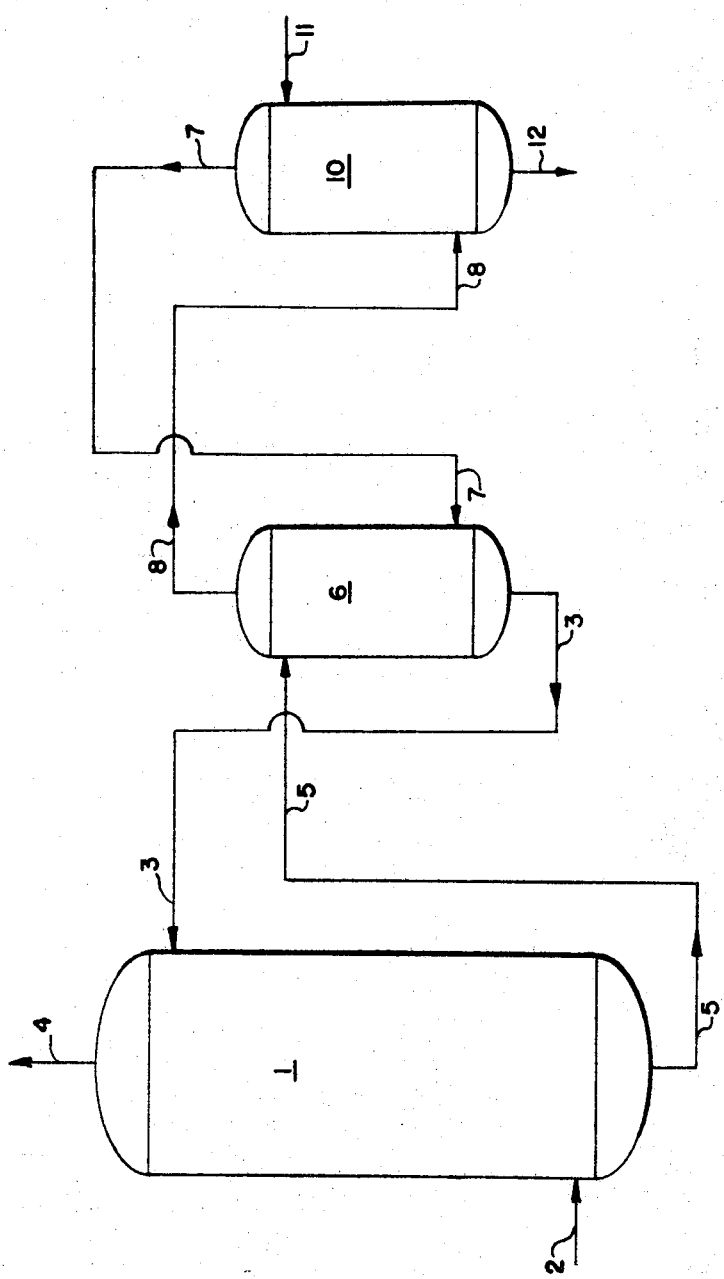

3,552,921
REMOVING SULFUR DIOXIDE FROM HOT GAS
George C. Blytas, Kensington, Calif., assignor to Shell Oil Company, New York, N.Y., a corporation of Delaware
Filed Aug. 28, 1968, Ser. No. 755,874
Int. Cl. C01b *17/56, 17/72*
U.S. Cl. 23—167                                   17 Claims

ABSTRACT OF THE DISCLOSURE

Removing sulfur dioxide from hot gas that contains sulfur dioxide and oxygen by contacting the gas with a molten salt system including potassium sulfate and potassium pyrosulfate and a third salt that depresses the melting point of the system, circulating the salt system between a gas contacting zone at a maximum temperature of 550° C. to a regenerating zone where the temperature of the system is raised to at least 600° C. to drive off sulfur trioxide.

BACKGROUND

Sulfur is a natural constituent of many raw materials used in industry. Materials such as petroleum, coal, and metal ores contain natural sulfur compounds that may be inorganic or organic. During processing, the sulfur compounds are frequently oxidized to sulfur dioxide and become part of a waste gas stream. Due to the noxious and poisonous nature of sulfur dioxide, it is necessary to limit the amount of sulfur dioxide that can be disposed of into the atmosphere as part of a waste gas stream; and frequently it is desirable to remove the sulfur dioxide from such gas streams simply for the sake of recovering a valuable material.

Removing sulfur dioxide from stack gases is a particularly difficult problem because the stack gases are so large in volume compared to the amount of sulfur dioxide present, because the stack gases are hot, and because the stack gases may contain ingredients that interfere with the sulfur dioxide removal process. Sulfur dioxide is an acid gas, but the usual processes for removing acid gas from a gas stream cannot be employed for stack gas. For example, the most prevalent and successful of such processes is to scrub the gas stream with an organic solvent such as an amine; however, hot stack gases decompose and vaporize organic materials so that they cannot be used, or at least cannot be used economically, in cleaning stack gases. In order to employ an organic liquid, it is necessary to cool the entire gas stream to a temperature that can be tolerated by the organic liquid; and after sulfur dioxide is removed, it is necessary to re-heat the entire gas stream in order to restore its buoyancy so that it may rise up a stack and carry into the atmosphere. Both cooling and heating of a large volume gas stream are difficult processes that cannot be justified economically for removing the small volume of sulfur dioxide contained in such a gas.

It has also been proposed to remove sulfur dioxide from stack gases with solid materials that are not affected by the temperature of the stack gases. The materials employed must be capable of absorbing sulfur dioxide selectively, or reacting with sulfur dioxide selectively to form unstable compounds that can be decomposed to regenerate the acceptor. Typical solid sulfur dioxide acceptors are metals or metal compounds that form unstable compounds with sulfur dioxide which are decomposable in a reducing regenerating atmosphere, or they are adsorbents such as activated charcoal that can be stripped of the adsorbed sulfur dioxide with much smaller volumes of a stripping gas in a zone maintained at higher temperatures than the adsorption zone. The problems involved in solid sulfur dioxide acceptors are that it is difficult to transport solid material from reaction zones to regeneration zones, it is difficult to maintain the capacity of such solid materials through many accepting-regenerating cycles; the solid acceptors are contaminated by unavoidable or unpredictable components in the gas, such as materials that will form stable compounds with metals, or solid materials such as fly ash that simply clog or coat beds of solid acceptors; and the necessity of heating solids and cooling solids between regenerating and accepting zones as well as the provision of a reducing gas that reacts with sulfur dioxide during regeneration and is not available cyclically within the process.

THE INVENTION

This invention provides a process for removing sulfur dioxide from hot oxygen-containing gas streams by a system that avoids or greatly mitigates all of the above-noted difficulties. The process of the present invention removes sulfur dioxide from hot gases with a liquid phase that can tolerate high temperatures, that experiences no loss of activity through multiple cycles, that doesn't vaporize, that isn't inactivated by solid contaminates or other ingredients of the stack gas, and that doesn't require a consumable reducing material for regeneration.

The process of this invention employs a molten salt system as the $SO_2$ accepting medium to remove $SO_2$ from a gas stream that also contains oxygen and is at a high temperature. The molten salt system employed in this invention includes potassium sulfate and potassium pyrosulfate. The term "molten" is intended to include a system that has sufficient liquid phase to be pumpable and it includes not only an entirely molten salt system but a molten salt system that contains solids and is circulatable as a slurry. The molten salt system may also contain other ingredients that are beneficial to the system such as melting point depressing salts. Other ingredients can be employed as long as they provide a beneficial function to the system without destroying its utility as a regeneratable $SO_2$ absorbent. Such materials as potassium metaphosphate, sodium sulfate, sodium pyrosulfate, lithium sulfate, manganese sulfate, potassium chromate, potassium chloride, potassium tungstate, potassium borate, and other salts are examples of melting point depressants that do not significantly interfere with the primary reaction involved in removing $SO_2$ from hot oxygen-containing gases. The molten salt system preferably contains from about 3 to about 60 percent potassium sulfate.

The primary reaction that is involved in reducing the sulfur dioxide level of a stack gas is a reaction wherein sulfur dioxide and oxygen react with potassium sulfate to form potassium pyrosulfate ($K_2S_2O_7$). At temperatures below 550° C. this reaction occurs to such an extent that sulfur dioxide is removed from an oxygen-containing gas stream down to a few parts per million of sulfur dioxide, and any lower temperature may be used at which a liquid salt system may be maintained. Temperatures of from 250–300° C. are preferred. Depending upon the proportion of potassium sulfate to potassium pyrosulfate in the absorbing liquid phase, the sulfur trioxide composition of the stack gas may also be maintained at a few parts per million which is an acceptable level to avoid contaminating the atmosphere. The reverse reaction where potassium pyrosulfate is heated in the presence of an inert stripping gas to produce potassium sulfate and sulfur trioxide is easily accomplished at temperatures in excess of 600° C., particularly if the proportion of potassium pyrosulfate is relatively high in the mixed salt system. Liberated sulfur trioxide is easily scrubbed from the inert gas with water or dilute sulfuric acid so that the inert gas stream may be circulated between the regeneration and scrubbing zones without being consumed.

The process of this invention can be best illustrated with reference to the accompanying drawing which shows one process embodying the invention and is intended to be illustrative rather than limiting on its scope. The drawing is highly schematic and does not illustrate pumps, valves, heaters, coolers, or controllers; however, it is intended that appropriate conventional equipment will be employed where it is obviously required in the process. The drawing also does not intend to illustrate relative sizes even though some vessels are illustrated as being substantially larger than others to show the order of magnitude of the equipment involved in the process.

A sulfur dioxide scrubbing zone 1 is illustrated where the hot oxygen and sulfur dioxide-containing gas is introduced into the lower portion of zone 1 through line 2 and countercurrently contacted therein with a descending stream of molten salt system containing potassium sulfate and potassium pyrosulfate introduced through line 3. As a result of the countercurrent contact, a substantially sulfur dioxide-free gas stream passes through line 4 to a stack, while a molten salt system stream enriched in potassium pyrosulfate passes through line 5. The stream in line 5 contains a substantially increased amount of potassium pyrosulfate over the amount contained in the stream entering line 3. The stream entering line 3 contains substantially more potassium sulfate than the stream discharging through line 5; and it will contain potassium sulfate, potassium pyrosulfate, and preferably a melting point depressant such as potassium metaphosphate.

The molten salt system enriched in potassium pyrosulfate passe through line 4 into the upper portion of a regenerating zone 6 wherein the temperature of the molten salt system is raised and it is contacted with an upwardly flowing stream of inert gas introduced at 7. As a result of the hot countercurrent contact with inert gas, a regenerated molten salt system is produced which contains a substantially higher proportion of potassium sulfate than the feed to zone 6, and it passes from the lower portion of regenerating vessel 6 through the before-mentioned line 3 that passes the system into the upper portion of contacting vessel 1. A gas stream containing substantial quantities of sulfur trioxide in inert gas passes from the upper portion of regenerating vessel 6 through line 8 and it is introduced into the lower portion of absorbing vessel 10 wherein it is contacted with a descending stream of water or dilute sulfuric acid introduced through line 11 which scrubs substantially all of the sulfur trioxide from the inert gas to produce a concentrated sulfuric acid stream passing from the bottom portion of absorber 10 through line 12. The substantially sulfur trioxide-free inert gas stream passes from the upper portion of absorber 10 through line 7 mentioned before as the source of inert gas to the lower portion of regeneration vessel 6.

In a typical embodiment of the present invention, a typical stack gas will enter contacting zone 1 at about 400° C. The lean melt entering the upper portion of contacting zone 1 will typically be at about 370° C. and it will be a slurry containing about 30 percent solids, which will be a slurry of potassium sulfate in a liquid potassium pyrosulfate-potassium metaphosphate melt. The slurry typically contains 10 percent potassium metaphosphate, 23 percent potassium sulfate, and 67 percent potassium pyrosulfate as it enters the sulfur dioxide absorber. The fat melt discharging from the bottom of contacting zone 1 through line 5 will normally contain about 9.25 percent potassium metaphosphate, 5.5 percent potassium sulfate, 85.25 percent potassium pyrosulfate and it will comprise a slurry containing about 20 percent solids. Each pass through contacting zone 1 will remove about 6.4 percent of the weight of slurry of sulfur dioxide. The contacting zone is externally cooled sufficiently so that the fat melt leaves the contacting zone at about 345° C.

The regeneration zone 6 functions at about 650° C. and ordinary heat exchange equipment is employed to heat the stream in line 5 to the regeneration temperature and to cool the stream in line 3 to the temperature at which it is introduced into the absorber.

Of course, both the regeneration zone and the absorber may be run at higher temperatures which will reduce the potassium pyrosulfate composition of the lean melt introduced to absorb sulfur dioxide. Varying the temperature of the melt will vary both the composition of the melt and the partial pressure of sulfur trioxide in the contacting zone 1. The temperature and composition of the melt will have to be adjusted depending on the temperature and composition of the incoming gas, the sulfur dioxide and sulfur trioxide composition that can be tolerated in the stack gas, and other design factors. It is evident that the process functioning in accordance with this invention can be designed to provide substantially any sulful dioxide and sulfur trioxide composition in the stack gas and it may be designed to absorb sulfur dioxide from the stack gas over wide ranges of composition.

The process of this invention may also include molten salt treating zones to remove solid impurities or salt degradation products from the melt. Although such impurities may be formed in the melt, they will not produce a significant effect on the process since the large bulk of absorbent liquid will be active and available to react with sulfur dioxide. Accordingly, the process of this invention is capable of treating gas streams that are relatively contaminated with solids or even active gaseous constituents. Since regeneration of the salt system of this invention is at temperatures at which the entire salt system is molten, filtering, or other means for removing solids should be done on the molten stream leaving the regenerator before it is cooled.

This invention may also include means for absorbing sulfur trioxide from a stack gas where the temperature of sulfur dioxide absorption is so high that an appreciable quantity of sulfur trioxide enters the gas stream. One preferred manner of maintaining the stack gas low in sulfur trioxide is to pass it through a bed of solid potassium sulfate, which will absorb sulfur trioxide by conversion to potassium pyrosulfate. This method is desirable because regeneration of the sulfur trioxide absorbent can be effected in the regular regeneration zone, and because all material used is compatible with the rest of the process.

What is claimed is:

1. A method for removing sulfur dioxide from a gas containing sulfur dioxide and oxygen which comprises contacting said gas with a molten salt system consisting essentially of potassium sulfate and potassium pyrosulfate at a temperature below 550° C. to react sulfur dioxide and oxygen with said sulfate salt thereby forming a pyrosulfate-rich salt system.

2. The process of claim 1 wherein the pyrosulfate-rich system is withdrawn from the contacting zone and is passed to a regenerating zone where its temperature is raised to at least 600° C. to convert a portion of the pyrosulfate salt to the sulfate salt thus regenerating the system.

3. The process of claim 1 wherein the said gas is treated at a temperature of from 250–500° C.

4. The process of claim 1 wherein said salt system contains from about 3 percent to about 60 percent potassium sulfate.

5. The process of claim 1 wherein a third salt is included in said salt system, the third salt having the effect of lowering the melting temperature of the system without producing a substantial adverse affect on the removal of sulfur dioxide.

6. The process according to claim 5 wherein said third salt is potassium metaphosphate.

7. The process according to claim 5 wherein said third salt is lithium sulfate.

8. The process according to claim 5 wherein said third salt is sodium sulfate.

9. The process according to claim 5 wherein said third salt is sodium pyrosulfate.

10. The process according to claim 5 wherein said third salt is manganese sulfate.

11. The process according to claim 5 wherein said third salt is potassium chloride.

12. The process according to claim 5 wherein said third salt is potassium chromate.

13. The process according to claim 5 wherein said third salt is potassium tungstate.

14. The process according to claim 5 wherein said third salt is potassium borate.

15. A process for removing sulfur dioxide from hot gas containing sulfur dioxide and oxygen which comprises contacting said gas with a molten salt system consisting essentially of potassium sulfate and potassium pyrosulfate at a temperature of from about 250° C. to about 500° C., withdrawing a pyrosulfate-rich salt system from the contacting zone and passing said salt system to a regenerating zone where its temperature is raised to at least 600° C. to convert a portion of the pyrosulfate salt to the sulfate salt and returning the regenerated salt system to contact with the sulfur dioxide-containing gas.

16. The process of claim 15 wherein sulfur trioxide is absorbed in an aqueous liquid.

17. The process of claim 15 wherein a stripping gas that is inert with respect to the molten salt system is employed to strip sulfur trioxide from the salt system.

References Cited

UNITED STATES PATENTS

| | | | |
|---|---|---|---|
| 2,233,841 | 3/1941 | Lepsoe | 23—178 |
| 3,438,728 | 4/1969 | Grantham | 23—181 |
| 3,454,360 | 7/1969 | Detweiler | 23—168 |

OTHER REFERENCES

Alien Property Custodian, S.N. 393,258 Beck et al., published July 13, 1943.

OSCAR R. VERTIZ, Primary Examiner

C. B. RODMAN, Assistant Examiner

U.S. Cl. X.R.

23—2, 174, 178